No. 756,159. PATENTED MAR. 29, 1904.
J. O. DECKERT.
BINDER.
APPLICATION FILED DEC. 26, 1903.
NO MODEL. 2 SHEETS—SHEET 2.

Witnesses
P. H. Nagle.
L. Douville.

Inventor
Joseph O. Deckert.
By Diederstein & Fairbanks.
Attorneys

No. 756,159. Patented March 29, 1904.

UNITED STATES PATENT OFFICE.

JOSEPH O. DECKERT, OF PHILADELPHIA, PENNSYLVANIA, ASSIGNOR TO WILLIAM MANN COMPANY, A CORPORATION OF PENNSYLVANIA.

BINDER.

SPECIFICATION forming part of Letters Patent No. 756,159, dated March 29, 1904.

Application filed December 26, 1903. Serial No. 186,619. (No model.)

*To all whom it may concern:*

Be it known that I, JOSEPH O. DECKERT, a citizen of the United States, residing in the city and county of Philadelphia, State of Pennsylvania, have invented a new and useful Improvement in Binders, of which the following is a specification.

My invention relates to binders.

It consists of novel means for operating and guiding the clamping-jaws by which a compact and simple device is produced.

It further consists of novel details of construction, all as will be hereinafter fully set forth, and particularly pointed out in the claims.

Figure 1:
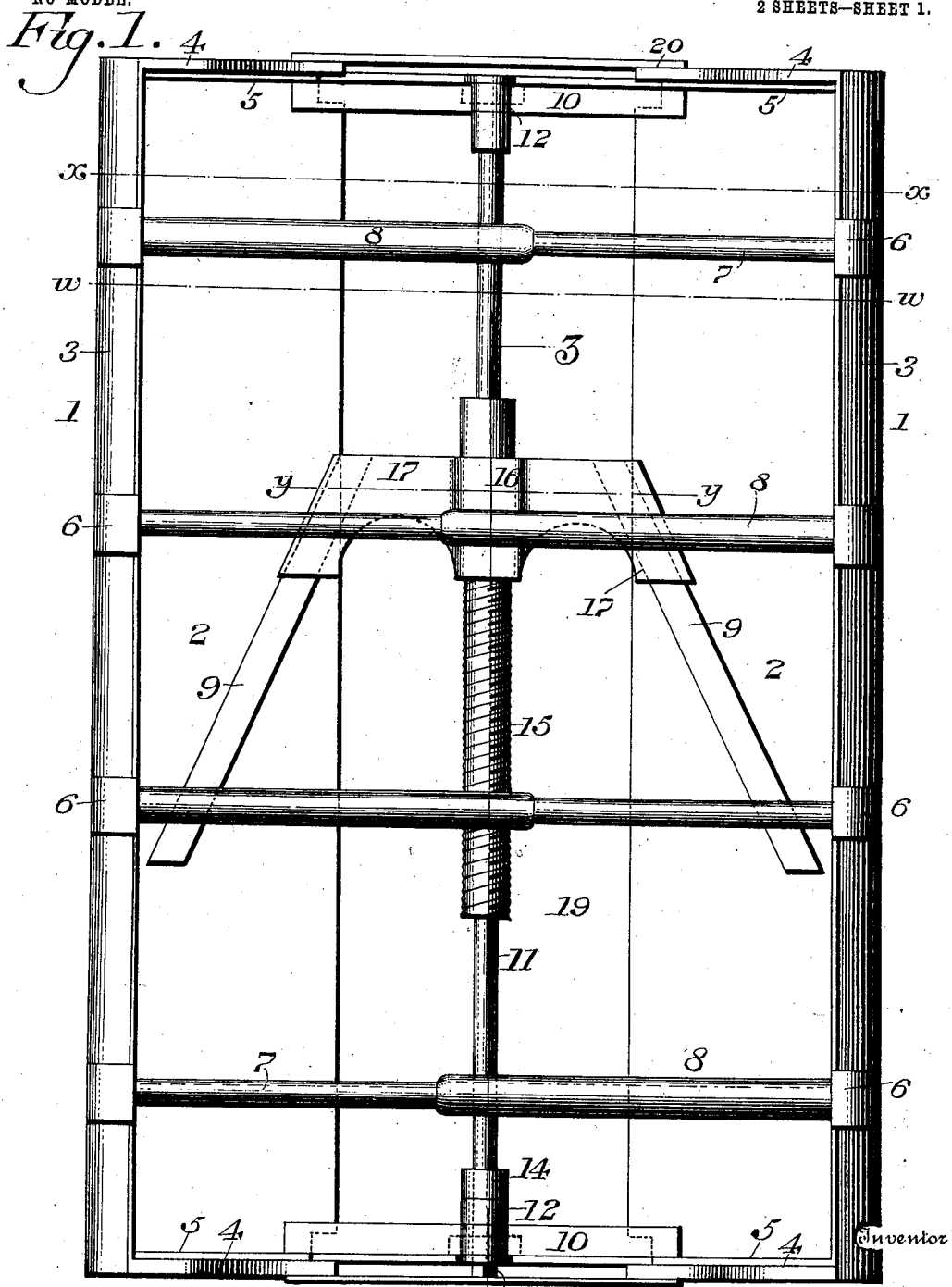
Figure 2:
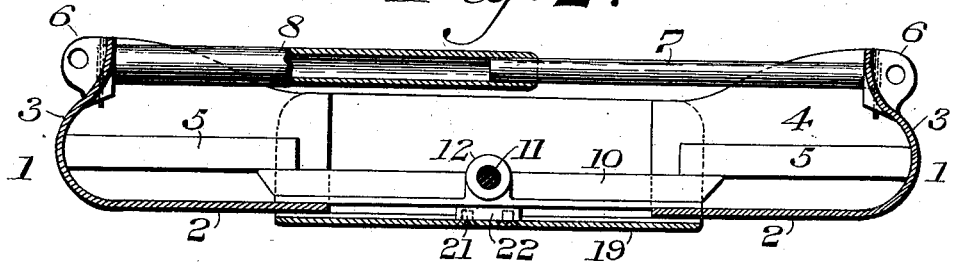
Figure 3:
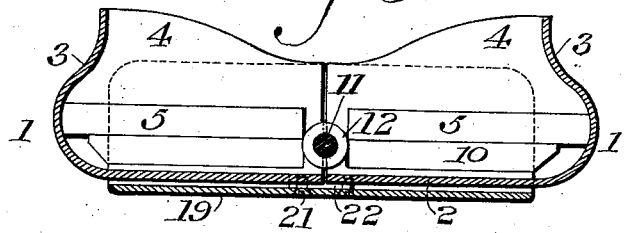
Figure 4:
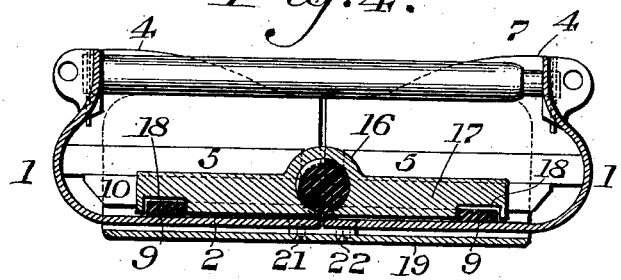
Figure 5:
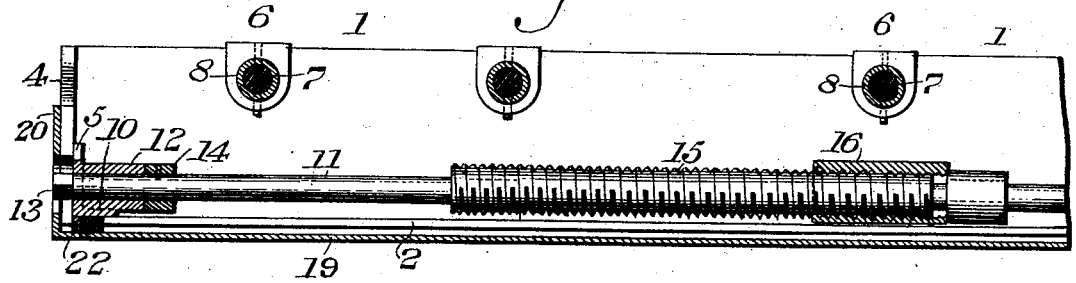

Figure 1 represents my device in plan view. Fig. 2 represents a transverse section through the line $w\ w$, Fig. 1. Figs. 3 and 4 represent transverse sections through points indicated by the lines $x\ x$, $y\ y$, respectively, but show the device in its retracted or collapsed position. Fig. 5 represents a partial longitudinal section through the lines $z\ z$, Fig. 1.

Similar numerals of reference indicate corresponding parts in the figures.

Referring to the drawings, 1 1 designate clamping-jaws having base portions 2, preferably flat, sides 3, end plates 4, and guide-bars 5. Attached to lugs 6 on the sides 3 are transverse supports consisting of coacting rods 7 and tubes 8, adapted to telescope into each other, as clearly shown in Fig. 2. On the base portions 2 are secured angularly-extending ribs 9. Bridge-plates 10, shown as of angular cross-section at each end of the device, engage between the base portions 2 and the guide-bars 5 and are held in position by a longitudinally-extending rod 11, rotatably mounted in bearings 12 on each of the plates 10. The rod 11 is squared at its free end 13 to engage a key or like device, by which it may be rotated. Secured on the rod 11 are collars 14, abutting against the bearings 12. Integral with or secured on the rod 11 is a screw 15 of quick pitch, on which is mounted a traveler, consisting of a nut 16 and wings 17, in which are grooves 18, corresponding in shape and angular relation to the ribs 9 and embracing the same. A back plate 19, having vertically-extending flanges 20 at its ends, is secured by screws 21 to the bridge-plates 10, and I have shown blocks 22 between said back plate and said bridge-plates.

The operation of the device will be readily understood from an inspection of the drawings. Where the device is used as a "loose-leaf ledger," to which it is particularly adapted, sheets of paper suitably notched are slipped over the supports formed of the telescoping rods 7 and in any desired number and are securely grasped between the jaws by rotating the rod 11, so as to draw the jaws together. It is evident that this action takes place by the movement of the traveler on the rod, by which the ribs 9 move in the grooves 17, the parts being held against longitudinal movement and free to move laterally, the base portions 2 and guide-bars 5 sliding on the bridge-plates 10.

It is evident that the bridge portions 10, which are within and extend between the jaws 1, being held asunder by the rod 11 and bearing against the end pieces 4 of the jaws, act to prevent relative longitudinal movement of the jaws, while guiding their transverse movement and holding them in the same plane. The rods 7 and tubes 8, on which the leaves, pamphlets, or the like are engaged, also assist in restraining and guiding the relative movement of the jaws. For this reason the device is practically complete, so far as its clamping and holding functions are concerned, without the back plate 19. This merely serves to cover the opening of the back portions 2 when these are separated and may be made perfectly flat, as shown. This adapts it to be covered with leather or the like from end to end, so that no metal is exposed.

It will be noted that the back of my device is practically flat and it rises only a very short distance above the desk or table on which it is laid. In this way the tendency of the back to roll when in use is prevented and a maximum proportion of the ledger-leaves is made useful for writing purposes.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. A binder comprising a pair of clamping-jaws held against longitudinal movement, means for moving said jaws to and from each other, bridge portions within and bearing upon said jaws and guides on said jaws adapted to sliding movement on said bridge portions.

2. A binder comprising a pair of clamping-jaws held against longitudinal movement, means for moving said jaws to and from each other, bridge portions within and between said jaws, guides on said jaws adapted to sliding movement on said bridge portions and supports bearing upon said jaws whether in their open or closed positions.

3. A binder comprising a pair of clamping-jaws held against longitudinal movement and having base portions, means for moving said jaws to and from each other, bridge portions within and extending between said jaws and bearing against said base portions and guides on said base portions also bearing against said bridge portions whereby said bridge portions are adapted to retain said clamping-jaws in suitable relation to each other during their movement.

4. A binder comprising a pair of clamping-jaws held against longitudinal movement and having flat base portions, means for moving said jaws transversely to and from each other, bridge portions within and extending between said jaws and bearing against said base portions and guides on said jaws also bearing against said bridge portions, whereby said bridge portions are adapted to retain said clamping-jaws in plane relation to each other during their transverse movement.

5. A binder comprising a pair of clamping-jaws having base portions, a longitudinal rod, a traveler on said rod, said traveler and said base portions being provided, the one with angular ribs and the other with angular grooves adapted to engage with said ribs, bridge portions in which said rod is rotatably mounted, said bridge portions being within and extending between said clamping-jaws and guides on said clamping-jaws adapted to sliding movement on said bridge portions and to prevent the relative longitudinal movement of said clamping-jaws while permitting their transverse movement.

6. A binder comprising a pair of clamping-jaws having base portions, angularly-disposed ribs on said base portions, a longitudinal rod, a traveler on said rod having angular grooves adapted to engage with said ribs, bridge portions in which said rod is rotatably mounted, said bridge portions being within and extending between said clamping-jaws and guides on said clamping-jaws adapted to sliding movement on said bridge portions and to prevent the relative longitudinal movement of said clamping-jaws while permitting their transverse movement.

7. A binder comprising a pair of clamping-jaws, means for moving such jaws transversely to and from each other, bridge portions within and extending between said jaws, guides on said jaws adapted to sliding movement on said bridge portions whereby said bridge portions are adapted to retain said clamping-jaws in plane relation to each other during their transverse movement and additional sliding means in said jaws for maintaining such plane relation.

8. A binder comprising a pair of clamping-jaws having flat base portions, means for moving said jaws transversely to and from each other, bridge portions within and extending between said jaws, guides on said jaws adapted to sliding movement on said bridge portions and a substantially flat plate adapted to cover the space between said jaws.

9. A binder comprising a pair of clamping-jaws, means for moving said jaws transversely to and from each other, bridge portions within and extending between said jaws, guides on said jaws adapted to sliding movement on said bridge portions and a plate secured to said bridge portions and covering the space between said jaws.

10. A binder comprising a pair of clamping-jaws, guides on said jaws, bridge portions within and extending between said jaws on which said guides have sliding movement, a rod extending between said jaws and rotatable therein, a screw on said rod, a traveler on said screw and coöperating devices on said traveler and said clamping-jaws whereby said jaws may be transversely moved.

JOSEPH O. DECKERT.

Witnesses:
JOHN A. WIEDERSHEIM,
C. D. McVAY.